(12) United States Patent
Lin

(10) Patent No.: US 7,000,878 B2
(45) Date of Patent: Feb. 21, 2006

(54) PIVOTAL SHAFT ASSEMBLY FOR A PLANE DISPLAY

(76) Inventor: Chin-Chih Lin, 3F, No. 128, Cha-Zhuang 1st Street, Kuei Shan, Taoyuan Hsien (TW)

( * ) Notice: Subject to any disclaimer, the term of this patent is extended or adjusted under 35 U.S.C. 154(b) by 11 days.

(21) Appl. No.: 10/722,606

(22) Filed: Nov. 28, 2003

(65) Prior Publication Data

US 2005/0092873 A1    May 5, 2005

(30) Foreign Application Priority Data

Oct. 29, 2003  (TW) .............................. 92219200 U

(51) Int. Cl.
*E04G 3/00* (2006.01)
(52) U.S. Cl. .................................... 248/276.1; 248/919
(58) Field of Classification Search ............. 248/278.1, 248/279.1, 288.31, 276.1, 180.1, 181.1, 181.2, 248/917–919, 125.1; 361/681
See application file for complete search history.

(56) References Cited

U.S. PATENT DOCUMENTS

| | | | |
|---|---|---|---|
| 5,271,651 A * | 12/1993 | Blatt et al. ..................... 294/88 |
| 6,220,556 B1 * | 4/2001 | Sohrt et al. ............... 248/279.1 |
| 6,343,006 B1 * | 1/2002 | Moscovitch et al. ........ 361/681 |
| 6,367,756 B1 * | 4/2002 | Wang ....................... 248/278.1 |
| 6,520,467 B1 * | 2/2003 | Thomas et al. ........... 248/309.3 |
| 6,554,238 B1 * | 4/2003 | Hibberd .................... 248/278.1 |
| 6,561,476 B1 * | 5/2003 | Carnevali .............. 248/288.31 |
| 6,579,017 B1 * | 6/2003 | Wei ............................. 396/428 |
| 6,581,892 B1 * | 6/2003 | Carnevali ................ 248/276.1 |
| 6,874,743 B1 * | 4/2005 | Watanabe et al. ........ 248/276.1 |
| 2004/0079858 A1 * | 4/2004 | Rudolf ........................ 248/919 |
| 2004/0084578 A1 * | 5/2004 | Cho et al. ................. 248/125.1 |
| 2005/0092873 A1 * | 5/2005 | Lin ........................... 248/125.9 |

FOREIGN PATENT DOCUMENTS

EP        1139003       *   4/2001

* cited by examiner

*Primary Examiner*—Anita King
*Assistant Examiner*—Tan Le
(74) *Attorney, Agent, or Firm*—Troxell Law Office, PLLC

(57) ABSTRACT

A pivotal shaft assembly for a plane display includes a bottom plate, a fixing member, a rotational member and a spherical nest device. The fixing member is mounted at the front side of the bottom plate and composed of a support base and a joint seat with the joint seat at a center thereof having a through shaft groove. The rotational member is a U shaped frame, extending downward along two lateral sides thereof a wing plate respectively with the wing plate beside an inner side thereof being a packing ring and a space in between fitting with the joining seat and an axial bolt passing over a securing hole of the two wing plates and the shaft groove with an end of the axial bolt being engaged to one of the wing plates and another end of the axial bolt being engaged to a threaded fastener to commonly enclose and press against two lateral sides of the joining seat. The spherical nest device has a positioning ball with an extension rod being enclosed with a semi-spherical durable ring at two lateral sides thereof respectively and is covered with a blocking lid and a front cover in a way of the extension rod piercing outward through the blocking lid to engage with the rotational member such that the rotational member can be adjusted an inclining angle backward and forward with respect to the fixing member and the front cover can be multi-directionally adjusted with respect to the positioning ball.

13 Claims, 5 Drawing Sheets

PIVOTAL SHAFT ASSEMBLY FOR A PLANE DISPLAY

BACKGROUND OF THE INVENTION

1. Field of the Invention

The present invention relates to a pivotal shaft structure, and particularly to a pivotal shaft assembly for a plane display so as to make an upward inclining angle or multi-directional rotations of the plane display possible.

2. Description of Related Art

Because a plane display such as liquid crystal display, liquid crystal television or plasma television has special features of lightness, thinness, shortness and smallness, the plane display has become a major product of display instead of the traditional CRT gradually. In order to have an optimum visual angle, the ordinary vertical type plane display is provided with a pivotal shaft device between the main body and the base thereof such as rotational shafts, which are disposed at both lateral sides of the display. In this way, the main body of the display can be adjusted an inclining angle forward or backward with respect to the base.

Considering available limited occupied space, some plane displays have to be hung to a stationary object such as a screen system in an office, an exhibition wall or a public open space and it is done with a standardized connecting plate being joined to the rear side of the display. The rear side of the connecting plate is then connected to a rotational shaft device, which is capable of swing along a transverse direction and a longitudinal direction respectively. Finally, the display can be adjusted an inclined angle forward or backward and a rotational motion to the right or the left.

However, it is not possible to comply with the need of multi-directional adjustments with only a rotational motion to the right or to the left. Thus, a spherical nest device, which is frequently used in lighting tools for multi-directional adjustments, is utilized by the suppliers and placed at the front side of the pivotal shaft structure and a lateral side of the spherical nest device is disposed next to one of the rotational shaft device such that the rotational shaft devices can be operated to adjust the frictional torque by way of double directional threaded connection. But, once one of the lateral sides is not screwed up tightly, it is often to occur a phenomenon of loosening to result in undesirable effect.

SUMMARY OF THE INVENTION

An object of the present invention is provide a pivotal shaft assembly for a plane display includes a bottom plate; a fixing member, being mounted at a front side of the bottom plate and being composed of a support base and a joint seat with the joint seat at a center thereof having a through shaft groove; a rotational member, being a U shaped frame, extending downward along two lateral sides thereof a wing plate respectively with the wing plate beside an inner side thereof being a packing ring and a space in between fitting with the joining seat and an axial bolt passing over a securing hole of the two wing plates and the shaft groove with an end of the axial bolt being engaged to one of the wing plates and another end of the axial bolt being engaged to a threaded fastener to commonly enclose and press against two lateral sides of the joining seat; and a spherical nest device, having a positioning ball with an extension rod being enclosed with a semi-spherical durable ring at two lateral sides thereof respectively, being covered with a blocking lid and a front cover in a way of the extension rod piercing outward through the blocking lid to engage with the rotational member such that the rotational member can be adjusted an inclining angle backward and forward with respect to the fixing member and the front cover can be multi-directionally adjusted with respect to the positioning ball.

Another object of the present invention is to provide a pivotal shaft assembly for a plane display, in which the blocking lid and the front cover provide at least three through holes and threaded joining holes respectively and the joining holes engage with screws, which pass through the through holes such that the blocking lid can press against or release from the positioning ball.

A further object of the present invention is provide a pivotal shaft assembly for a plane display, in which the blocking lid at a periphery thereof is provided with outer threads and at a rear side thereof has a plurality of operational holes, which space apart from each other with a circular equidistance and the front cover has inner threads such that two of the operational holes can be inserted with a fixture to turn the blocking lid so as to perform pressing against or releasing from the positioning ball.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
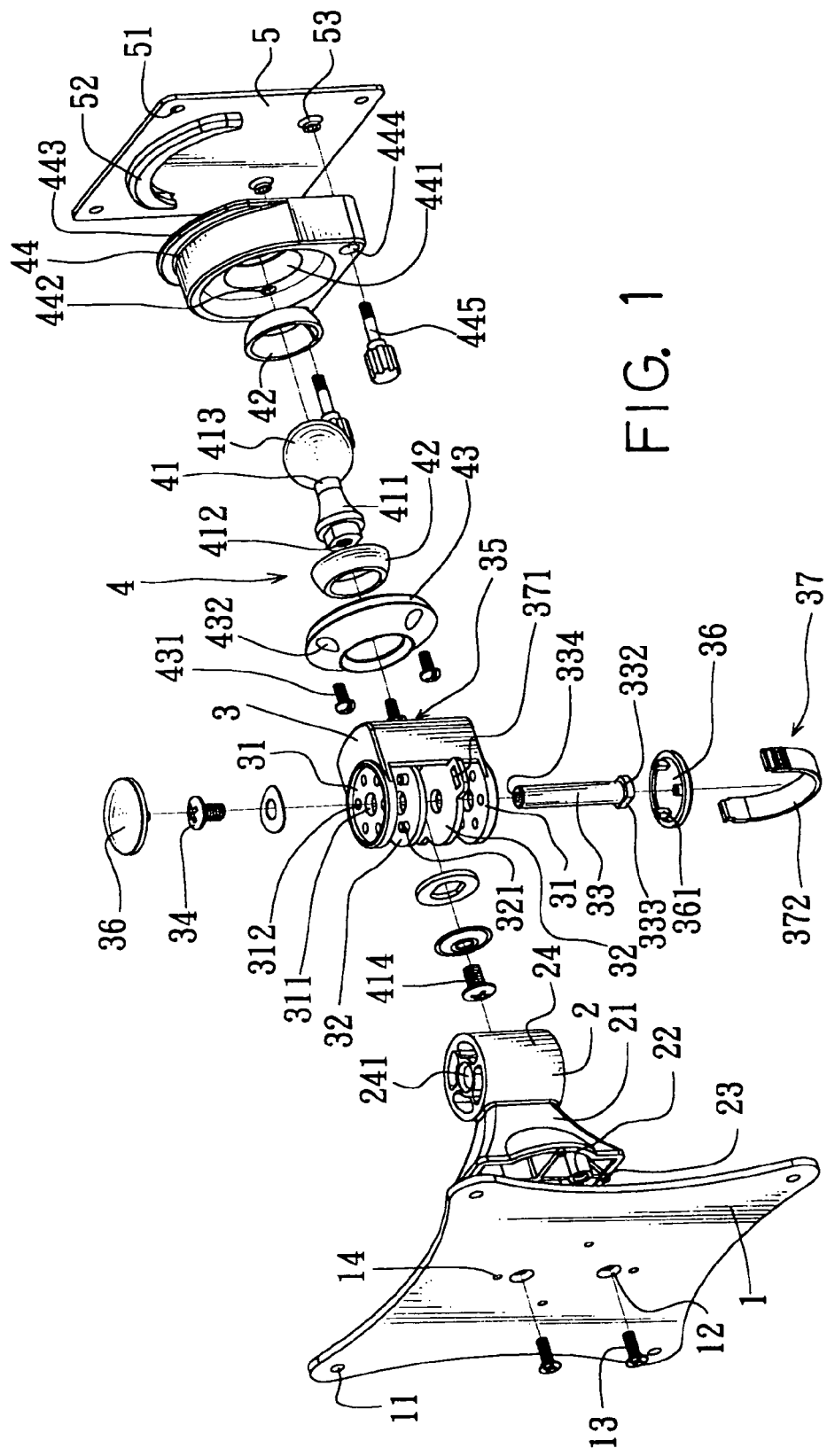
FIG. 1 is an exploded perspective view of a pivotal shaft assembly for a plane display according to the present invention.
Figure 2:
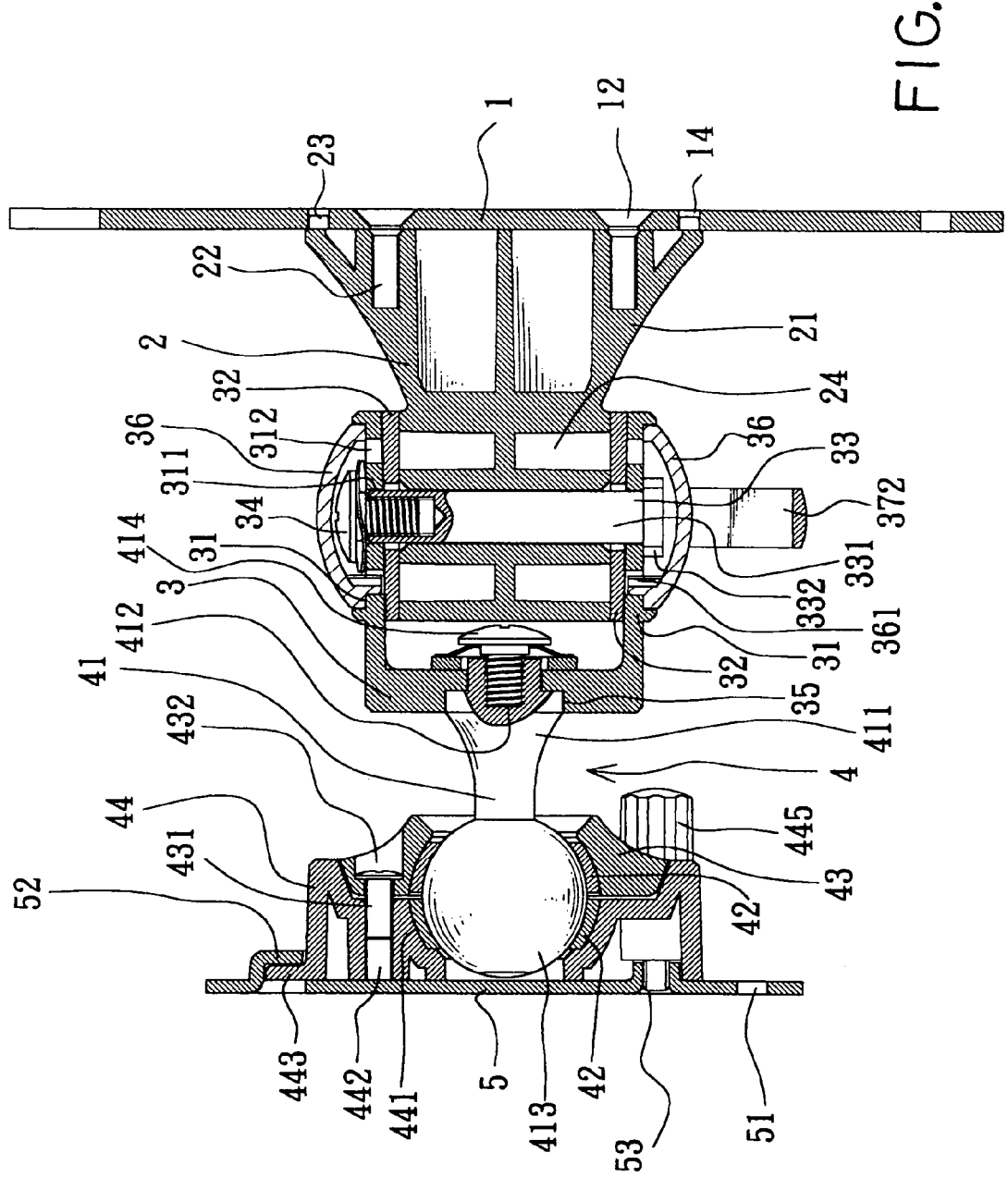
FIG. 2 is an assembled sectional view of the pivotal shaft assembly shown in FIG. 1.
Figure 5:
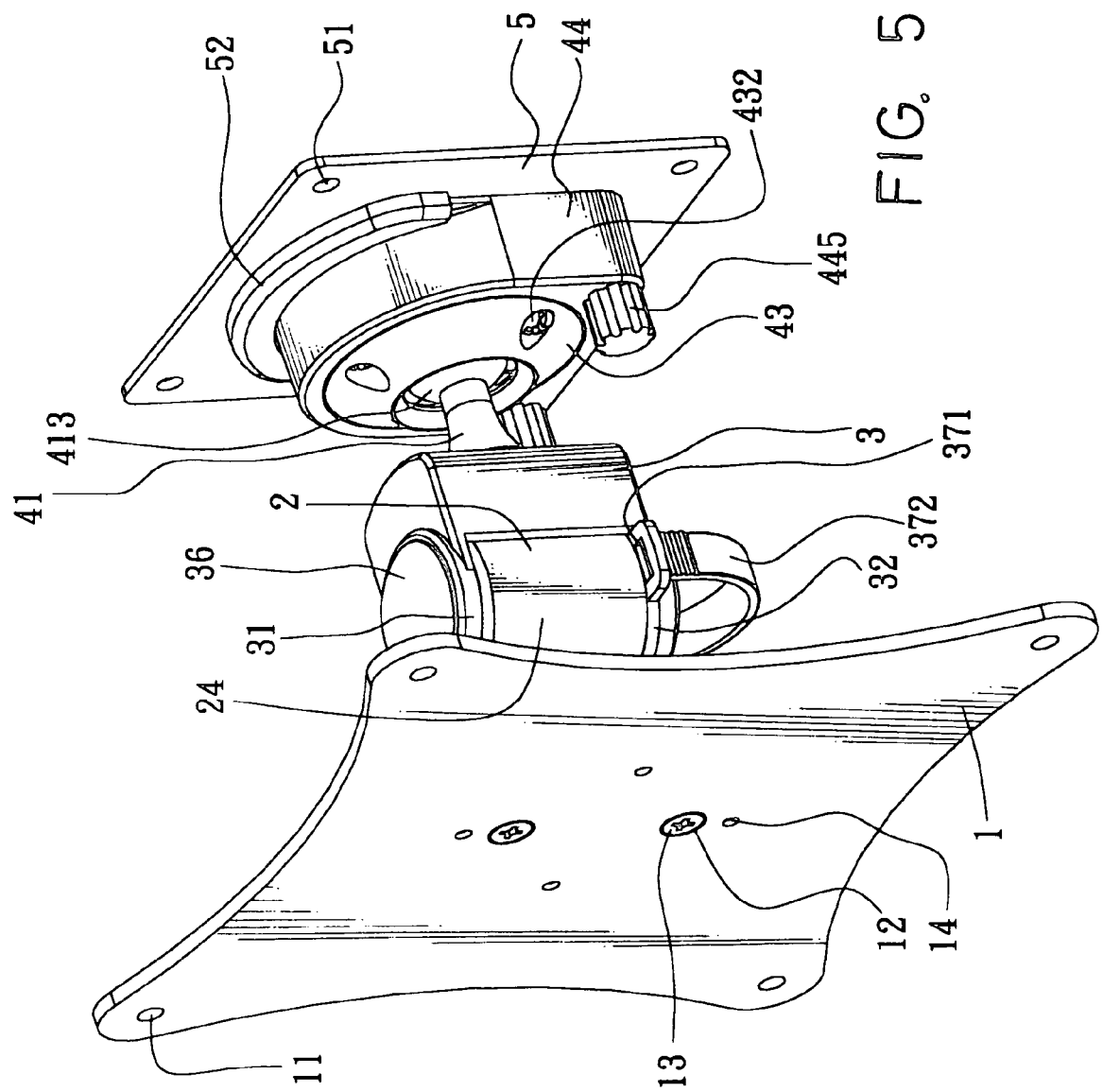
FIG. 5 is a perspective view of the pivotal shaft assembly after being assembled.

Referring to FIGS. 1, 2 and 5, a pivotal shaft assembly according to the present invention includes a bottom plate 1, a fixing member 2, a rotational member 3, a spherical nest device 4 and a connecting plate 5.

Wherein, the bottom plate 1 is flat with a plurality of plate holes or plate grooves 11 for being passed through with screws and fastened to a stationary article such as a wall. The bottom plate 1 at the center thereof is provided with at least a through hole 12 for being passed with a screw 13 so as to be fastened to a preset threaded hole 22 at the bottom of the fixing member 2. In addition, a plurality of locating holes 14 are provided near the through hole 12 for being inserted with locating tenons 23 at the bottom of the fixing member 2.

The fixing member 2 at the bottom thereof has a support base 21 with the threaded hole 22 and the locating tenons 23 corresponding to the through hole 12 and the locating holes 14 so that the fixing member 2 can be joined to the bottom plate 1 firmly by way of the screw 13 passing through the holes 12, 22 and the locating tenons 23 fitting with the locating holes 14. Because these are conventional art, no details will be described further. Besides, the support base 21 at the front side thereof integrally connects a joint seat 24 and it is preferable that the joint seat 24 is cylindrical with a central shaft groove 241.

The rotational member 3 is a U-shaped frame with two lateral sides thereof extending outward a wing plate 31 corresponding to the size of the joint seat 24 and the inner sides thereof next to a packing ring 32 respectively so that the joint seat 24 can be just received in a space between the packing rings 32 with the shaft groove 241 being opposite to a central engaging hole 311 of the respective wing plage 31. Once, an axial bolt 33 is inserted into one of the wing plate 31 via the engaging hole 311 thereof and passes over the shaft groove 241, the axial bolt 33 at the free end 331 thereof is received in the engaging hole 311 of another wing plate 31 with a bolt head 332 at the lower end thereof being held by a holding part 312 (not shown in FIG. 2) at the second wing plate 31. For instance, the bolt head 332 has at least a flat edge 333 engaging with a stopper extending from the wing plate 31 to form a state of firm joint. Afterward, a threaded fastener 34 such as a screw engages with the free end 331 to allow the two wing plates 31 and a threaded hole 334 of the axial bolt 34 gradually clamping two lateral sides of the joint seat 24 commonly so as to constitute frictional torque. Further, the rotational member 3 at the front side thereof is provided with a connecting hole 35 for the spherical nest device 4 being able to be held at said front side.

Further, in order to let the two packing disks 32 being located between the wing plates 31, there are a plurality of projections 321 disposed at the outer side of the respective packing disk 32 and it is preferable that three projections 321 are provided to insert into fitting holes 312 near the rim of the respective wing plate 31. Besides, each wing plate 31 at the outer side thereof is attached with a decoration cover 36 and a plurality of cover projections 361 are disposed at the inner side of the decoration cover 36. It is preferable that three pieces of cover projections 361 are provided for being inserted into further fitting holes 312 other than those fitting with the projections 321 so as to hide the threaded fastener 34 and the bolt head 332. In addition, the present invention further includes a wire arranging device 37, which is composed of a pair of opposite engaging part 371 extending outward from the circumference of one of the packing disks 32 and an engaging ring 372 at two ends thereof engaging with the engaging parts 371 to form an enclosing space, and the lead wires can passed through the enclosing space without being out of order.

The spherical nest device 4 has a connecting stem 41 and an extension rod 411 extends from an end of the connecting stem 41 to pass through both of a spherical durable ring 42 and a blocking lid 43 to fit with the connecting hole 35 with a joining piece 44 such as a screw for engaging with a rod hole 413 so as to form a state of being located. A positioning ball 413 is disposed the front end of the extension rod 411 ands at the front side of the positioning ball 413 is enclosed by another spherical durable ring 42 and pressed against a circular recess part 441 at the center of a front cover 44. In the meantime, screws 431 pass through at least three through holes 432 preset at the lid 43 and are fastened to joining holes 442 at the rim of the circular recess part 441. In this way, the positioning ball 413 can generate frictional torque by way of the two durable rings 42 approaching each other gradually to provide a function of directional adjustment. Besides, the front cover 44 at the upper rim thereof extends outward an engaging plate 443 and at the bottom thereof has a piercing hole 444 at two opposite sides respectively.

The connecting plate 5 at the periphery thereof has plate holes 51 for being passed through with screws and fastened to a plane display and at the rear side thereof is provided with an upper lap part 52 for engaging with the engaging plate 443. Two engaging holes 53 are aligned with the piercing holes 444 and each engaging hole 53 is fastened with a hand knob bolt 445 via the corresponding piercing hole 444 respectively. Hence, the plane display can be mounted to the front side of the pivotal shaft assembly.

Figure 3:
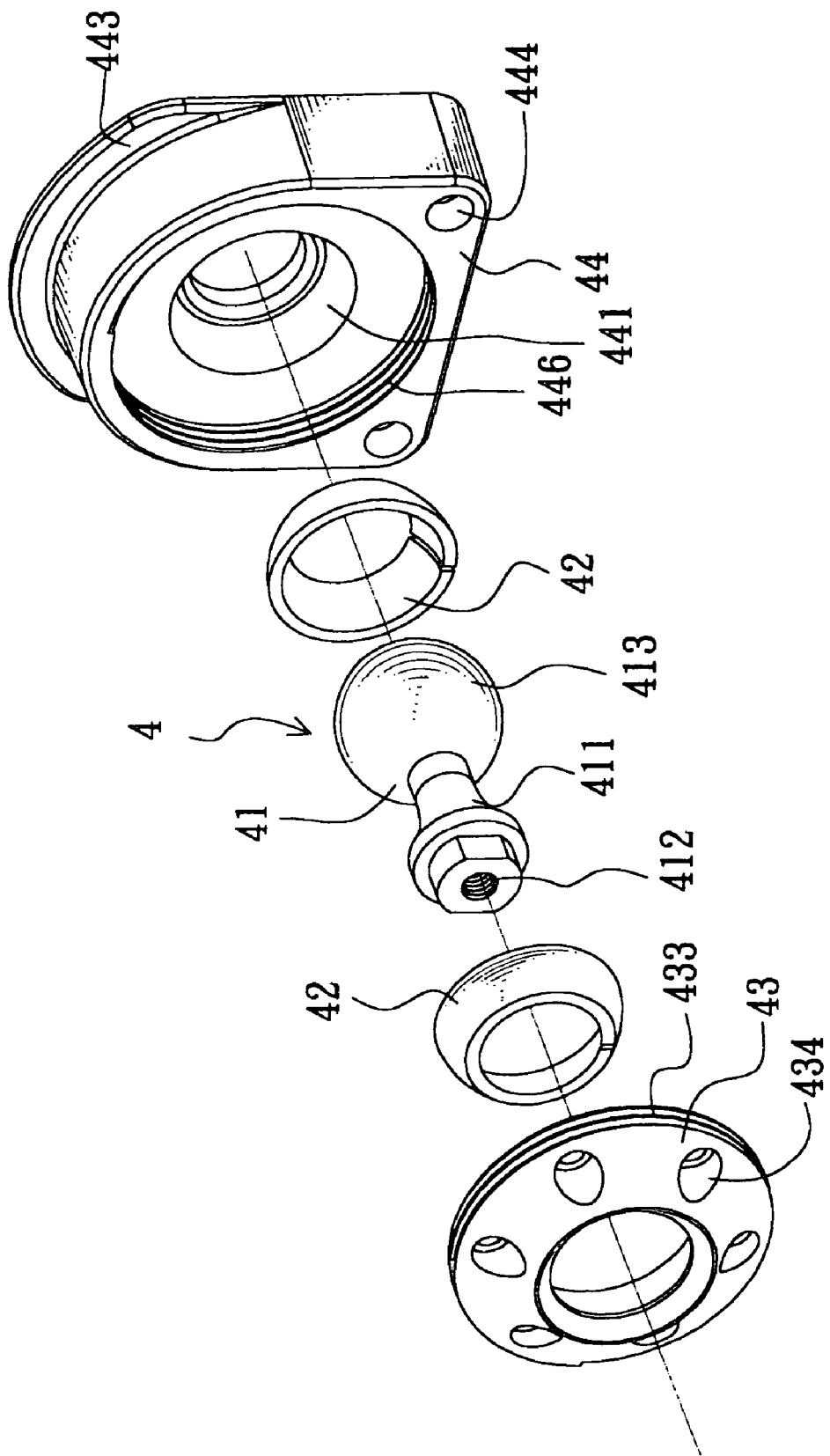
FIG. 3 is a perspective view of another embodiment according to the present invention.
Figure 4:
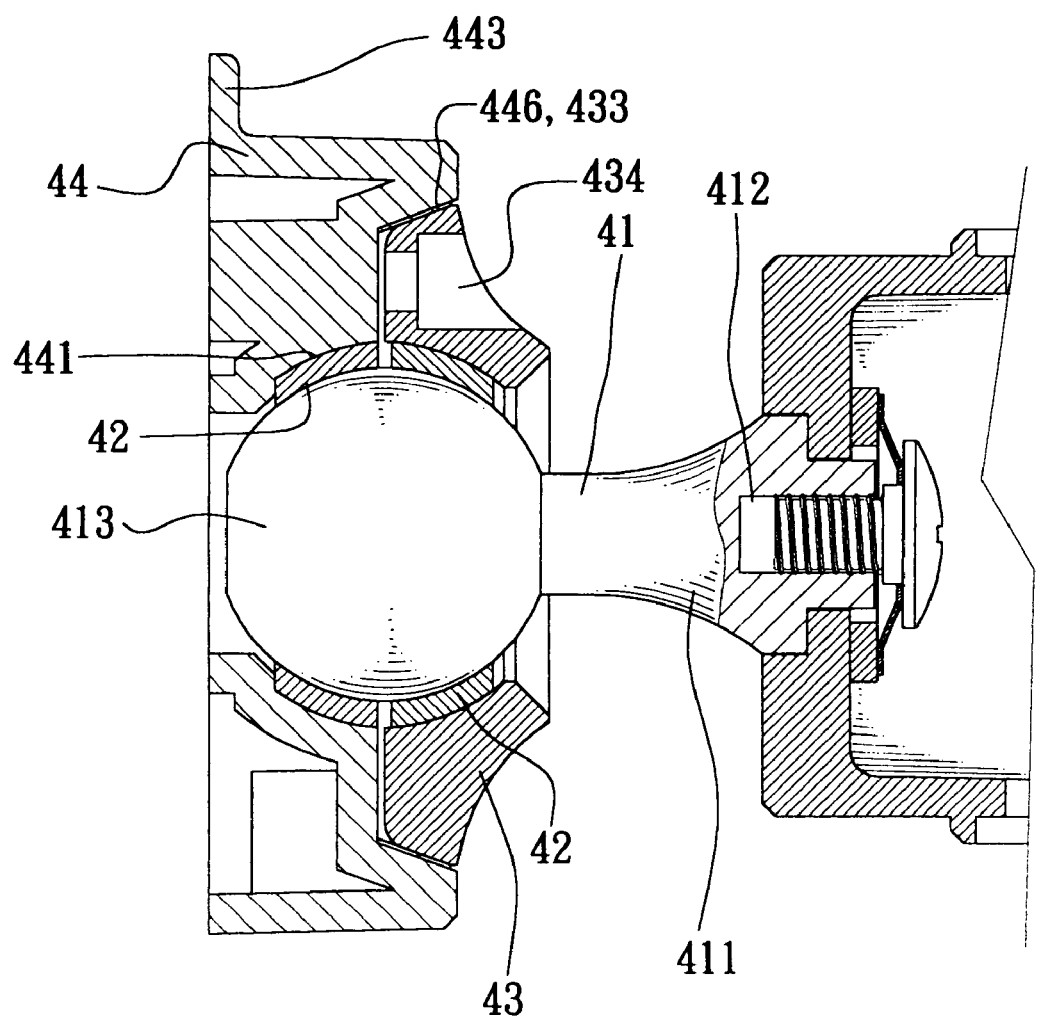
FIG. 4 is an assembled sectional view of the pivotal shaft assembly shown in FIG. 3.

Referring to FIGS. 3 and 4, another embodiment of the spherical nest device 4 is illustrated. The difference of the present embodiment from the preceding embodiment is in that the blocking lid 43 at the circumferential edge thereof is provided with outer threads 433 and at the rear side thereof is provided with a plurality of operational holes 434, which are spaced apart from each other with an equal circular distance. The front cover 44 is provided with inner threads 446 corresponding to the outer threads 433. A fixture can be inserted into any two opposite ones of the operational holes 434 to turn the blocking lid 43 in a way of the outer threads 433 engaging with the inner threads 446 such that the positioning ball 413 can be covered completely by the two packing disks 42 to prevent from eccentric movement resulting from uneven frictional torque.

It is appreciated that while the pivotal shaft assembly for a plane display according to the present invention is in use, it is only necessary to turn the threaded fastener so as to allow the axial bolt generating a relative motion such that the two oppositely disposed wing plates and packing disks can be pressed or released respectively for adjusting the torque value to avoid torque offset resulting from bi-directional adjustments. Besides, the spherical nest device can provide a better frictional torque and adjust the torque value by way of two different lids and the front cover so that the phenomenon of offset is resisted during multi-directional adjustments being executed. In addition, a retaining ring type of wire arrangement device is mounted in the pivotal shaft assembly of the present invention for the lead wires and signal wires not tangling to each other. Furthermore, it is possible for the user to join the front cover and the connecting plate quickly with the elongated hand knob bolt instead of hand tool, which is hard to perform the joining job due to being blocked by the lid.

While the invention has been described with reference to the preferred embodiments thereof, it is to be understood that modifications or variations may be easily made without departing from the spirit of this invention, which is defined by the appended claims.

What is claimed is:
1. A pivotal shaft assembly for a plane display comprising:
 a) a bottom plate;
 b) a fixing member having:
  i) a support base connected to a front of the bottom plate; and
  ii) a joint seat having a shaft groove through a center thereof;
 c) a rotational member being a U-shaped frame and having:
  i) two wing plates protruding outwardly from opposing ends thereof, each of the two wing plates having an engaging hole, the joint seat being located between the two wing plates;
  ii) two packing rings, one of the two packing rings being located between each of the two wing plates and the joint seat; and
  iii) an axial bolt inserted through the engaging hole of a first wing plate of the two wing plates, the shaft groove, and the engaging hole of a second wing plate of the two wing plates, the axial bolt being connected to a threaded fastener at a first end thereof selectively securing the joint seat between the two wing plates; and d) a spherical nest device having:
   i) a connecting stem having a positioning ball and an extension rod connected to the positioning ball;
   ii) first and second semi-spherical durable rings;
   iii) a blocking lid covering the first semi-spherical durable ring and having a through hole, the extension rod extending through the through hole and is connected to the rotational member; and
   iv) a front cover connected to the blocking lid and the rotational member on opposite sides thereof, the second semi-spherical durable ring being inserted into the front cover, the first and the second semi-spherical durable rings are located on opposing sides of the positioning ball between the front cover and the blocking lid, wherein the rotational member is pivotally adjustable with respect to the fixing member, and the front cover is pivotally and rotatably adjustably with respect to the rotational member.

2. The pivotal shaft assembly according to claim 1 further comprising a plurality of screws movably between locked and unlocked positions, the blocking lid having at least three blocking lid through holes, the front cover having at least three threaded joining holes aligning with the at least three blocking lid through holes, each of the plurality of screws is inserted through one of the at least three blocking lid through holes and connected to one of the at least three threaded joining holes, when the plurality of screws are in the locked position, the positioning ball is fixed between the locking lid and the front cover, and, when the plurality of screws are in the unlocked position, the positioning ball is pivotally and rotationally adjustable between to the locking lid and the front cover.

3. The pivotal shaft assembly according to claim 2, wherein the blocking lid having external threads and a plurality of operational holes equally spaced around and outer periphery thereof, the front cover having internal threads threadedly connected to the external threads, the blocking lid is movably between locked and unlocked positions relative to the front cover by utilizing a fixture inserted into selected holes of the plurality of operational holes to turn the blocking lid, when the blocking lid is in the locked position, the positioning ball is fixed between the locking lid and the front cover, and, when the blocking lid is in the unlocked position, the positioning ball is pivotally and rotationally adjustable between to the locking lid and the front cover.

4. The pivotal shaft assembly according to claim 1, wherein the bottom plate having one of a plurality of plate holes and a plurality of plate grooves.

5. The pivotal shaft assembly according to claim 1, further comprising a bottom plate screw, the bottom plate having a piercing hole located in a center thereof, the support base having a threaded base hole, the bottom plate screw is inserted through the piercing hole and connected to the threaded base hole, such that the fixing member is connected to the bottom plate.

6. The pivotal shaft assembly according to claim 1, wherein the bottom plate having a plurality of locating holes, the support base having a plurality of locating tenons, each of the plurality of locating tenons is inserted into one of the plurality of locating holes.

7. The pivotal shaft assembly according to claim 1, wherein each of the two wing plates having a plurality of fitting holes spaced around an outer periphery, each of the two packing rings having a plurality of projections aligning with the plurality of fitting holes, each of the plurality of projections is inserted into one of the plurality of fitting holes.

8. The pivotal shaft assembly according to claim 1, wherein the axial having a bolt head having at least one flat edge engaging a stopper of one of the two wing plates.

9. The pivotal shaft assembly according to claim 1, further comprising two decoration covers, one of the two decoration covers covering each of the two wing plates.

10. The pivotal shaft assembly according to claim 9, wherein each of the two wing plates having a plurality of fitting holes spaced around an outer periphery, each of the two decoration covers having a plurality of projections aligning with and inserted into the plurality of fitting holes.

11. The pivotal shaft assembly according to claim 1, further comprising a wire arranging device having an engaging ring having one of two opposing ends connected each of two engaging parts located on opposing sides of one of the two packing rings.

12. The pivotal shaft assembly according to claim 1, further comprising a connecting plate having a lap part and a plurality of engaging holes, the front cover having a plurality of piercing holes, and a plurality of fasteners, one of the plurality of fasteners is inserted through each of the plurality of fasteners piercing holes and connected to each of the plurality of fasteners engaging holes.

13. The pivotal shaft assembly according to claim 12, wherein each of the plurality of fasteners is a hand knob threaded bolt.

* * * * *